(12) United States Patent
Vega

(10) Patent No.: US 10,703,327 B2
(45) Date of Patent: Jul. 7, 2020

(54) SEATBELT ASSEMBLY

(71) Applicant: Ford Global Technologies, LLC, Dearborn, MI (US)

(72) Inventor: Daniel Vincent Vega, Belleville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 113 days.

(21) Appl. No.: 15/890,416

(22) Filed: Feb. 7, 2018

(65) Prior Publication Data
US 2019/0241151 A1    Aug. 8, 2019

(51) Int. Cl.
| | |
|---|---|
| *B60R 22/03* | (2006.01) |
| *B60R 22/02* | (2006.01) |
| *B60R 22/20* | (2006.01) |
| *B60R 22/26* | (2006.01) |
| *A44B 11/25* | (2006.01) |
| *B60R 22/18* | (2006.01) |

(52) U.S. Cl.
CPC ........ *B60R 22/023* (2013.01); *A44B 11/2515* (2013.01); *A44B 11/2561* (2013.01); *B60R 22/20* (2013.01); *B60R 22/26* (2013.01); *B60R 2022/1806* (2013.01)

(58) Field of Classification Search
CPC ............ B60R 22/023; B60R 2022/021; B60R 2022/1806; B60R 2022/18; B60R 22/18; B60R 2022/208; B60R 22/20; B60R 22/26; B60R 22/263; B60R 22/266; B60R 22/03; A44B 11/2515; A44B 11/2561; B60N 2/688

USPC ....................................................... 280/801.2
See application file for complete search history.

(56) References Cited

U.S. PATENT DOCUMENTS

| | | | |
|---|---|---|---|
| 6,079,744 A * | 6/2000 | Husby | B60R 22/48 180/268 |
| 6,851,713 B2 * | 2/2005 | Mattes | B60R 22/48 280/801.1 |
| 8,215,716 B2 | 7/2012 | Akaike et al. | |
| 2002/0043872 A1 | 4/2002 | Townsend et al. | |
| 2014/0132056 A1 | 5/2014 | Yilma | |

(Continued)

FOREIGN PATENT DOCUMENTS

| | | |
|---|---|---|
| DE | 102015016470 A1 | 7/2017 |
| EP | 1223087 B1 | 2/2005 |

(Continued)

OTHER PUBLICATIONS

UK Combined Search and Examination Report dated Aug. 2, 2019 re GB Appl. No. 1901570.0.

*Primary Examiner* — Jack W Lavinder
(74) *Attorney, Agent, or Firm* — Frank A. MacKenzie; Bejin Bieneman PLC

(57) ABSTRACT

A restraint system includes a first member including a first hole and fixable to a seat frame, a second member including a second hole and slidably coupled to the first member between a retracted position in which the first and second holes are aligned and an extended position in which the first and second holes are spaced from each other, a buckle housing fixed to the second member, and a tongue including a third hole and insertable into the buckle housing to an inserted position in which the second and third holes are aligned.

18 Claims, 5 Drawing Sheets

(56) References Cited

U.S. PATENT DOCUMENTS

2016/0129877 A1    5/2016  Spahn et al.
2017/0273412 A1    9/2017  Karuppaswamy et al.

FOREIGN PATENT DOCUMENTS

GB      2356890 A      6/2001
JP      2011000907 A   1/2011

* cited by examiner

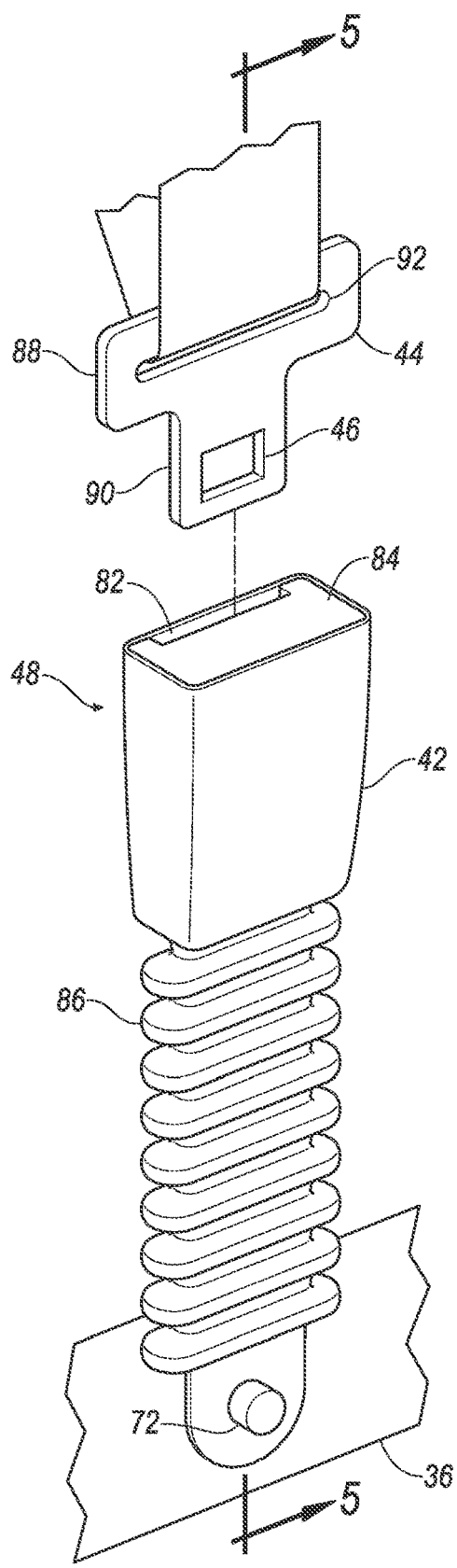
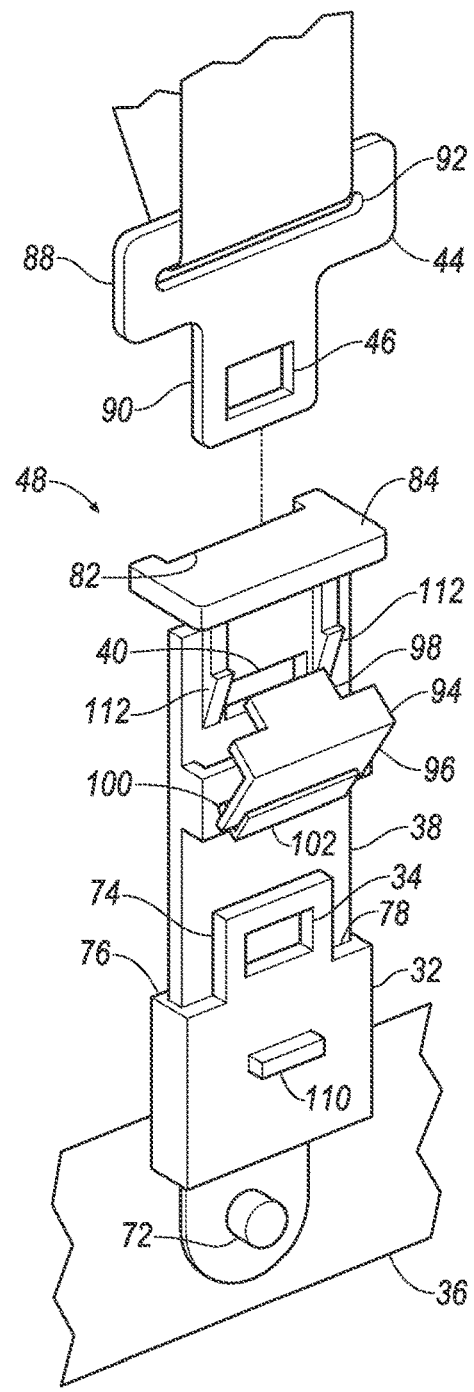
FIG. 3
FIG. 4

SEATBELT ASSEMBLY

BACKGROUND

Vehicles include seatbelts for each of the seats onboard. The seatbelt includes webbing that, when the seatbelt is buckled, extends across an occupant of the seat. An anchor attaches one end of the webbing to a seat frame. The other end of the webbing feeds into a retractor, which includes a spool that pays out and retracts the webbing. A tongue slides freely along the webbing and, when engaged with a buckle, divides the webbing into a lap band and a shoulder band. One type of seatbelt is a three-point harness, meaning that the webbing is attached at three points around the occupant when fastened: the anchor, the retractor, and the buckle.

BRIEF DESCRIPTION OF THE DRAWINGS

FIG. 3 is a perspective view of a buckle assembly of the restraint system.

FIG. 4 is a perspective view of the buckle assembly with a buckle housing and a cover removed for illustration.

DETAILED DESCRIPTION

Figure 1:
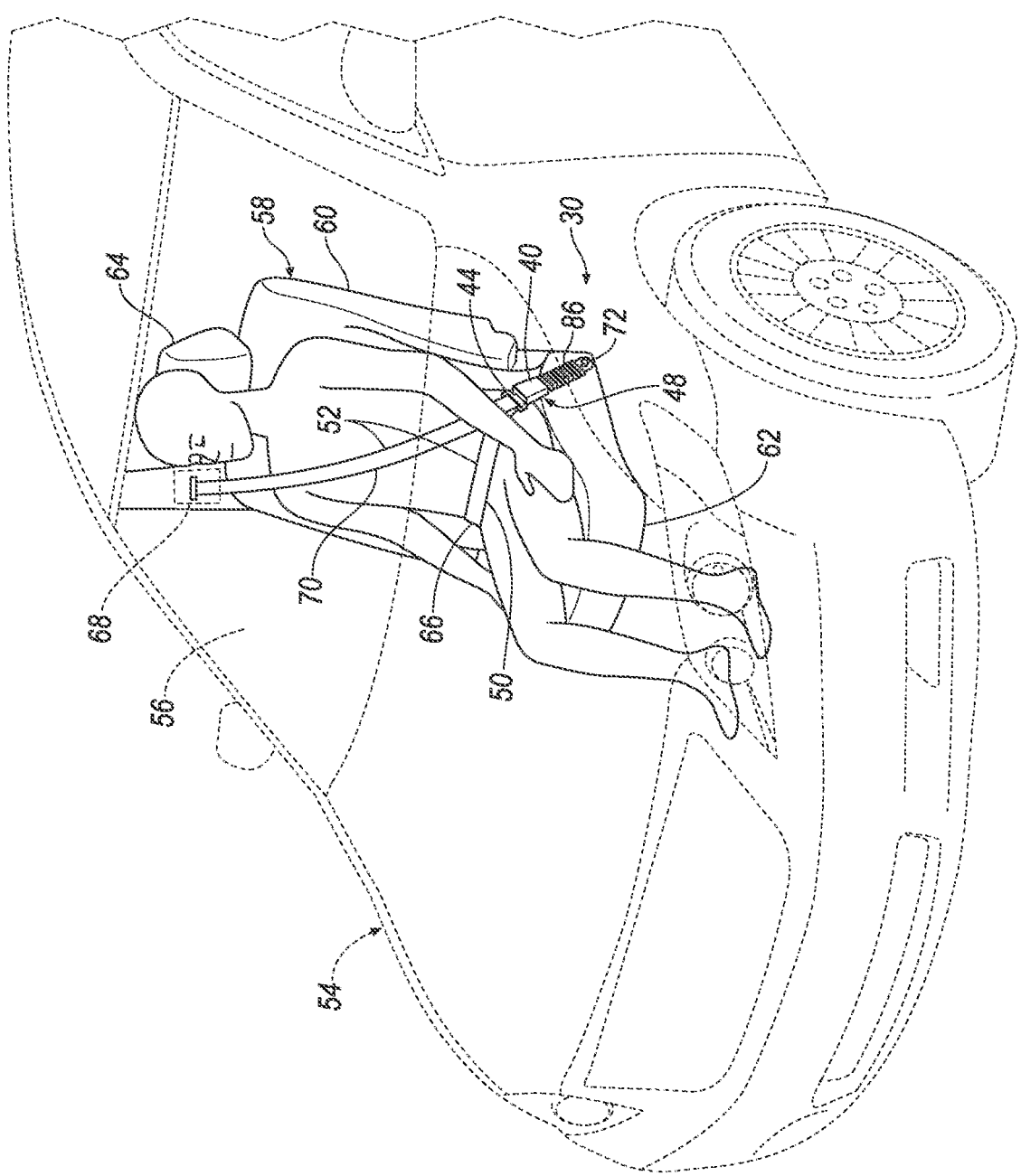
FIG. 1 is a perspective view of a vehicle including a seat.

A restraint system includes a first member including a first hole, a second member including a second hole and slidably coupled to the first member between a retracted position in which the first and second holes are aligned and an extended position in which the first and second holes are spaced from each other, a buckle housing fixed to the second member, and a tongue including a third hole and insertable into the buckle housing to an inserted position in which the second and third holes are aligned.

The restraint system may further include a spring biasing the second member to the extended position.

The restraint system may further include a latch coupled to the second member and movable between an engaged position and a disengaged position. The latch in the engaged position may extend through the first, second, and third holes when the second member is in the retracted position and the tongue is in the inserted position.

The restraint system may further include a latch spring biasing the latch to the engaged position. The restraint system may further include a release lever movably coupled to the second member between a catching position and a releasing position, and the release lever in the catching position may hold the latch in disengaged position. The release lever in the releasing position may permit the latch to move to the engaged position.

The restraint system may further include a release spring biasing the release lever to the catching position.

The first member may include a trip positioned to push the release lever to the releasing position when the second member is in the retracted position. The trip may be spaced from the release lever when the second member is in the extended position.

The first member may be elongated in a direction, and the second member may be elongated in the direction. The second member may be slidable relative to the first member in the direction.

The tongue may be insertable into the buckle housing in the direction.

The direction may be a first direction, and the first hole, the second hole, and the third hole may be aligned in a second direction transverse to the first direction when the second member is in the retracted position and the tongue is in the inserted position.

With reference to the Figures, wherein like numerals identify like elements throughout the view, a restraint system 30 is shown. The restraint system 30 includes a first member 32 including a first hole 34 and fixable to a seat frame 36. The restraint system 30 includes a second member 38 including a second hole 40. The second member 38 is slidably coupled to the first member 32 between a retracted position in which the first and second holes 40, 46 are aligned and an extended position in which the first and second holes 40, 46 are spaced from each other. A buckle housing 42 is fixed to the second member 38. A tongue 44 includes a third hole 46 and is insertable into the buckle housing 42 to an inserted position in which the second and third holes 40, 46 are aligned. (The adjectives "first," "second," and "third" are used throughout this document as identifiers and are not intended to signify importance or order.)

The restraint system 30 provides a buckle assembly 48 that is easily accessible by an occupant while fastening a lap band 50 of webbing 52 low and tight across the occupant's hips. Fastening the webbing 52 low and tight can help keep the occupant in a proper position during an impact and reduce a likelihood of "submarining," i.e., sliding under the lap band 50 during an impact. The restraint system 30 does not require electrical power or electronic controllers. The restraint system 30 is intuitive for the occupant to operate. The restraint system 30 can accommodate a standard-sized tongue 44 and buckle assembly 48, making the restraint system 30 easier to understand for the occupant. The restraint system 30 offers a slim packaging design.

With reference to FIG. 1, a vehicle 54 includes a passenger cabin 56 to house occupants, if any, of the vehicle 54. The passenger cabin 56 includes a plurality of seats 58, including one or more front seats 58 disposed at a front of the passenger cabin 56 and one or more back seats 58 disposed behind the front seats 58. The passenger cabin 56 may also include third-row seats 58 (not shown) at a rear of the passenger cabin 56. In FIG. 1, the seat 58 is shown to be a bucket seat, but the seats 58 may be other types. The position and orientation of the seats 58 and components thereof may be adjustable by an occupant.

Figure 2:
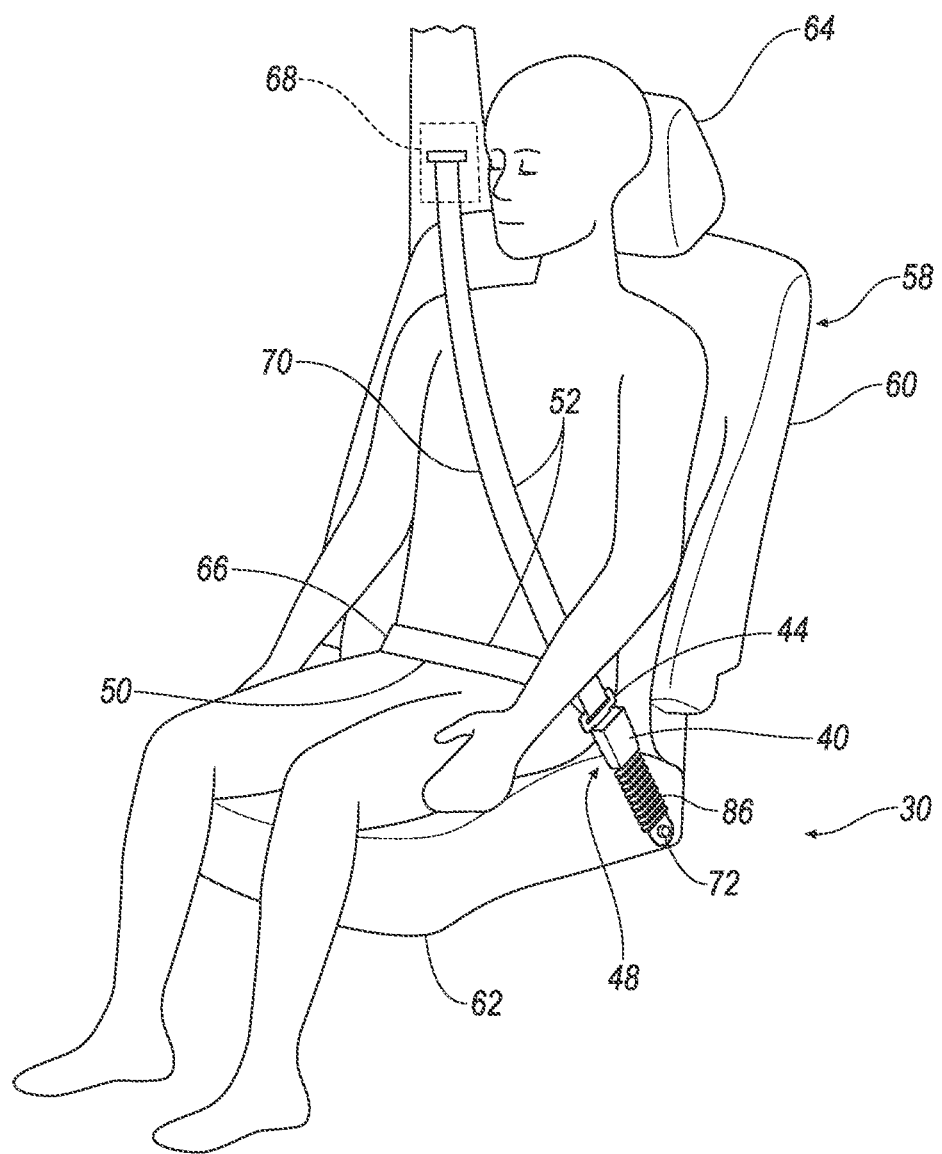
FIG. 2 is a perspective view of the seat with a restraint system.

With reference to FIG. 2, the seat 58 may include a seat back 60, a seat bottom 62, and a headrest 64. The headrest 64 may be supported by the seat back 60 and may be stationary or movable relative to the seat back 60. The seat back 60 may be supported by the seat bottom 62 and may be stationary or movable relative to the seat bottom 62. The seat back 60, the seat bottom 62, and/or the headrest 64 may be adjustable in multiple degrees of freedom. Specifically, the seat back 60, the seat bottom 62, and/or the headrest 64 may themselves be adjustable, in other words, adjustable components within the seat back 60, the seat bottom 62, and/or the headrest 64, and/or may be adjustable relative to each other.

The seat frame 36 may include panels and/or may include tubes, beams, etc. The frame may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

The restraint system 30 is a three-point harness, meaning that the webbing 52 is attached at three points around the occupant when fastened: an anchor 66, a retractor 68, and the buckle assembly 48. The restraint system 30 may, alternatively, include another number and/or arrangement of attachment points. The anchor 66 attaches one end of the webbing 52 to the seat frame 36. The other end of the webbing 52 feeds into the retractor 68, which may include a spool (not shown) that extends and retracts the webbing 52. The tongue 44 slides freely along the webbing 52 and, when engaged with the buckle assembly 48, divides the webbing 52 into the lap band 50 and a shoulder band 70.

With reference to FIGS. 4-7, the buckle assembly 48 includes the first member 32. The first member 32 is fixable to the seat frame 36. For example, the first member 32 may be fastened to the seat frame 36 by, e.g., a bolt 72. The first member 32 may be rotatable about the bolt 72 or may have a fixed orientation relative to the seat frame 36. The first member 32 is elongated in a first direction A. The first direction A may be upward and/or forward relative to the seat frame 36 from the bolt 72. The first direction A may be straight or may be curved inward toward a middle of the seat 58.

The first member 32 includes an outer plate 74 and an inner plate 76 with a first-member slot 78 defined between the outer plate 74 and the inner plate 76. The first member 32 is arranged so that the outer plate 74 is farther from the seat 58 than the inner plate 76 is. The first-member slot 78 is sized to receive the second plate. The outer plate 74 and the inner plate 76 may both be elongated in the first direction A, and the first-member slot 78 may be defined along the first direction A. The first member 32 includes the first hole 34. Specifically, one of the outer plate 74 and the inner plate 76 may be elongated farther in the first direction A and include the first hole 34. As shown in the figures, the outer plate 74 is elongated in the first direction A and includes the first hole 34.

The second member 38 is elongated in the first direction A. The second member 38 may have a constant cross-section orthogonal to the first direction A. The second member 38 is shaped to fit in the first-member slot 78. Specifically, a cross-section of the second member 38 orthogonal to the first direction A is shaped to fit in the first-member slot 78. The second plate may be generally flat. The second member 38 includes the second hole 40.

The second member 38 is slidably coupled to the first member 32. For example, the second plate is disposed in the first-member slot 78 and is able to move unobstructed only along the first direction A. The second member 38 is slidable relative to the first member 32 in the first direction A. The second member 38 is slidable between a retracted position and an extended position. When the second member 38 is in the retracted position, the first and second holes 40, 46 are aligned; for example, the first and second holes 40, 46 are aligned in a second direction B transverse, e.g., perpendicular, to the first direction A. When the second member 38 is in the extended position, the first and second holes 40, 46 are spaced from each other.

With continued reference to FIGS. 4-7, a spring 80 biases the second member 38 to the extended position. A first end of the spring 80 may be attached to the first member 32, and a second end of the spring 80 may be attached to the second member 38. The spring 80 may be any suitable type of spring, e.g., a cassette spring, a linear spring, etc.

With reference to FIG. 3, the buckle housing 42 is fixed to the second member 38. The buckle housing 42 extends around a portion of the second member 38 including the second hole 40. When the second member 38 is in the retracted position, the buckle housing 42 extends around a portion of the first member 32 including the first hole 34. The buckle housing 42 partially defines a buckle-housing slot 82. The buckle housing 42 and a button 84 together define the buckle-housing slot 82. The buckle-housing slot 82 is sized to receive the tongue 44.

A cover 86 may be attached to the first member 32 and to the buckle housing 42. The cover 86 may be elongated along the first direction A and may be extendible in the first direction A, i.e., able to lengthen and shorten in the first direction A. For example, the cover 86 may have an accordion shape. The cover 86 may extend around the first member 32. When the second member 38 is in the extended position, the cover 86 may extend around an entirety of the first member 32 or may extend around a portion of the first member 32 including the first hole 34. When the second member 38 is in the retracted position, the cover 86 may extend around a portion of the first member 32. The cover 86 may also extend around a portion of the second member 38 in both the extended position and the retracted position.

The tongue 44 includes a body portion 88 and an insertable portion 90. The tongue 44 may be generally flat. The body portion 88 may include a tongue slot 92, through which the webbing 52 may extend. The insertable portion 90 may be shaped to be inserted in the buckle-housing slot 82 in the buckle housing 42, and the body portion 88 may be wider than the buckle-housing slot 82. The tongue 44 includes the third hole 46; specifically, the insertable portion 90 may include the third hole 46.

Figure 5:
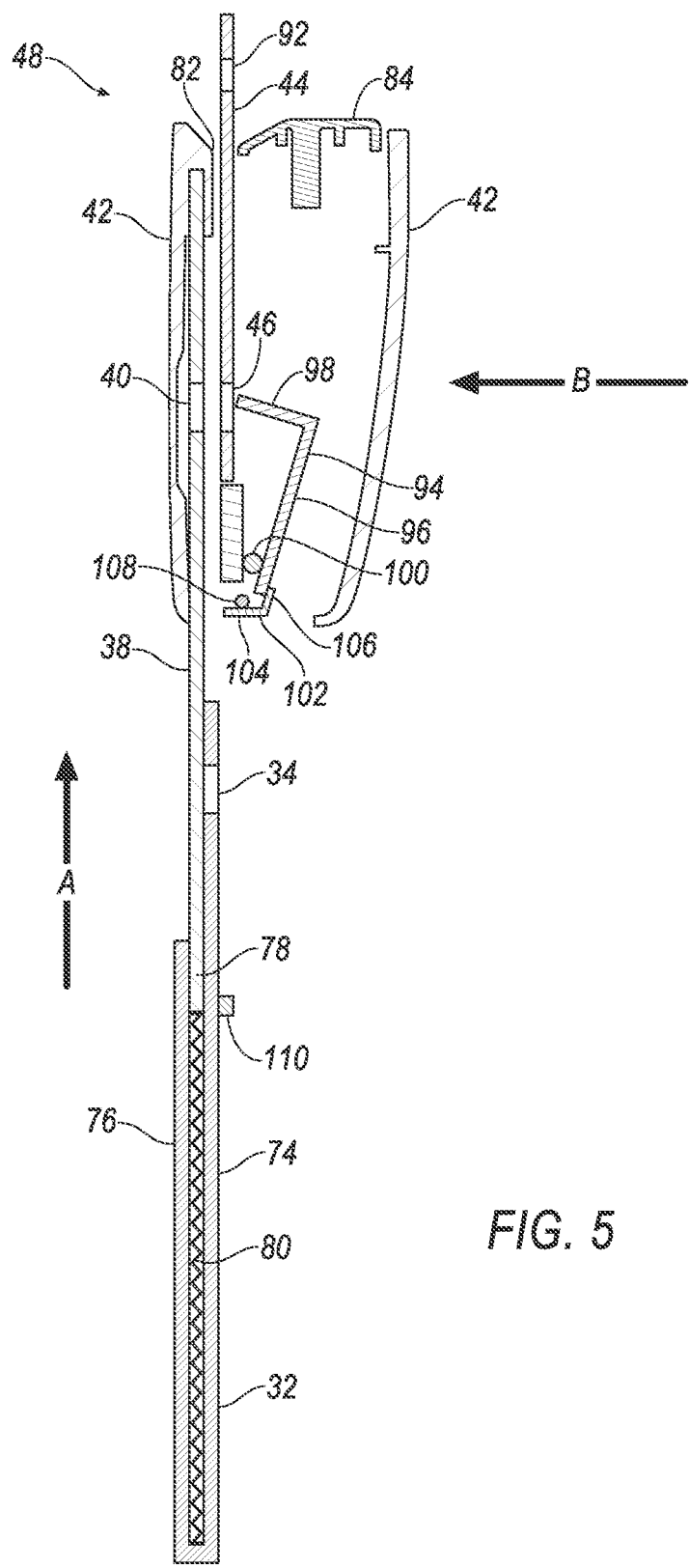
FIG. 5 is a cross-sectional side view of the buckle assembly with a tongue in an inserted position and a second member in an extended position.
Figures 6, 7:
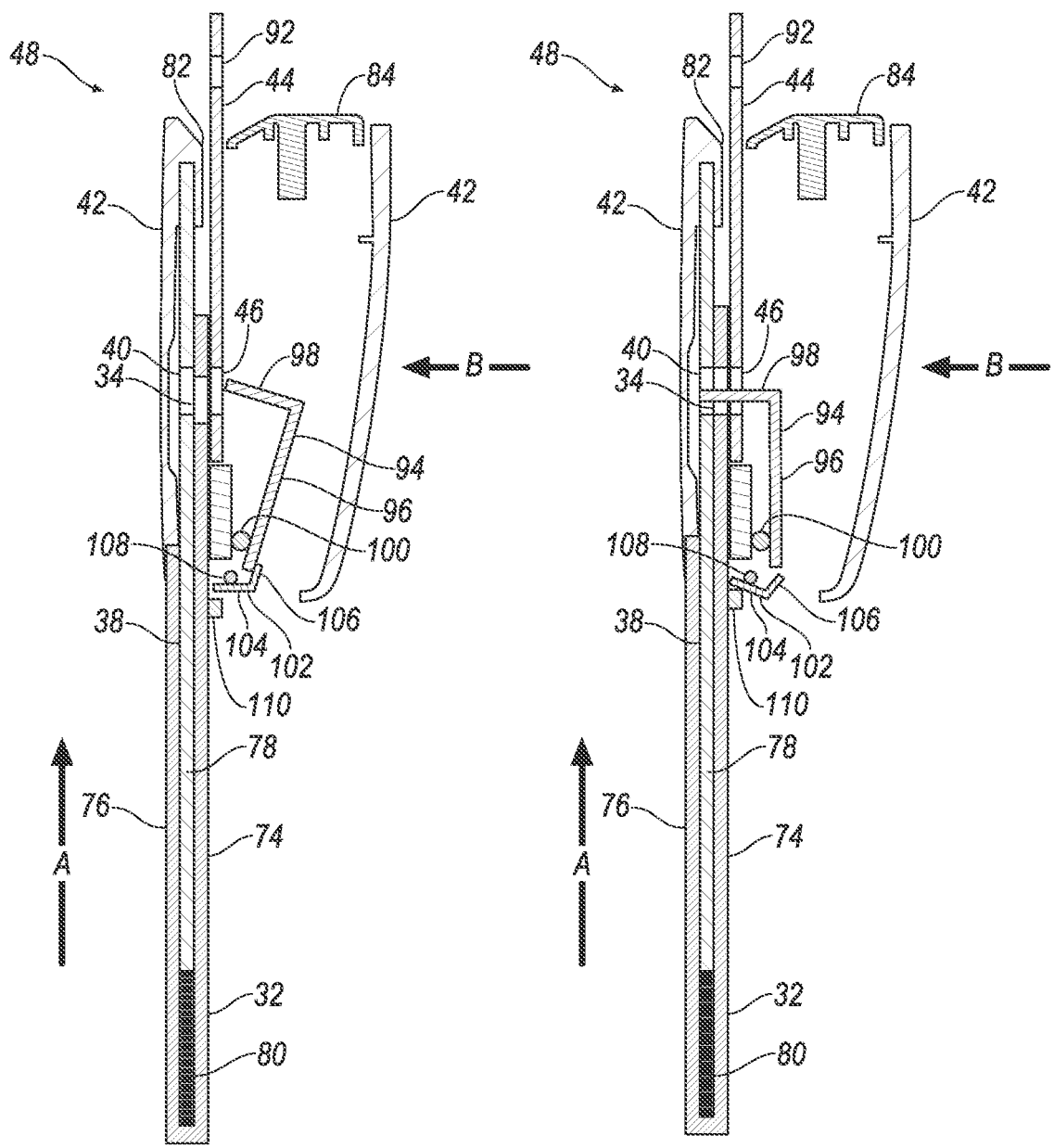
FIG. 6 is a cross-sectional side view of the buckle assembly with the tongue in the inserted position and the second member between the extended position and a retracted position.
FIG. 7 is a cross-sectional side view of the buckle assembly with the tongue in the inserted position and the second member in the retracted position.

With reference to FIGS. 4-7, the tongue 44 is movable by the occupant from a free position to an inserted position. In the free position, as shown in FIG. 4, the tongue 44 is spaced from the buckle housing 42. In the inserted position, as shown in FIGS. 5-7, the tongue 44, specifically the insertable portion 90, is fully inserted into the buckle housing 42. When the tongue 44 is in the inserted position, the second and third holes 40, 46 are aligned; for example, the second and third holes 40, 46 are aligned in the second direction B transverse, e.g., perpendicular, to the first direction A. When the second member 38 is in the retracted position and the tongue 44 is in the inserted position, as shown in FIG. 7, the first hole 34, the second hole 40, and the third hole 46 are aligned in the second direction B.

A latch 94 is coupled to the second member 38. The latch 94 may include an elongated portion 96 and a catching portion 98. The elongated portion 96 is coupled to the second member 38. The catching portion 98 may be shaped to fit through the first hole 34, the second hole 40, and the third hole 46. The catching portion 98 may be at least as long as a combined thickness of the tongue 44, the outer plate 74 of the first member 32, and the second member 38.

The latch 94 is movable between an engaged position, shown in FIG. 7, and a disengaged position, shown in FIG. 4-6. For example, the latch 94 may be rotatable relative to the second member 38. In the engaged position, the latch 94 extends through the first, second, and third holes 34, 40, 46 when the second member 38 is in the retracted position and the tongue 44 is in the inserted position. More specifically, when the latch 94 is in the engaged position, the catching portion 98 of the latch 94 extends through the first, second, and third holes 34, 40, 46 when the second member 38 is in the retracted position and the tongue 44 is in the inserted position. When the latch 94 is in the disengaged position, the catching portion 98 of the latch 94 is spaced from the second hole 40 of the second member 38.

A latch spring 100 may bias the latch 94 to the engaged position. The latch spring 100 may be attached to the latch 94, e.g., to the elongated portion 96 of the latch 94, and to the second member 38. The latch spring 100 may be any suitable type of spring, e.g., a torsional spring, etc.

A release lever 102 is movably coupled to the second member 38. The release lever 102 includes an elongated portion 104 and a catching portion 106. The elongated portion 104 is coupled to the second member 38. The catching portion 106 may be shaped to obstruct the latch 94 in the disengaged position from moving to the engaged position.

The release lever 102 is movable relative to the second member 38 between a catching position, shown in FIGS. 4-6, and a releasing position, shown in FIG. 7. In the catching position, the release lever 102, e.g., the catching portion 106 of the release lever 102, holds the latch 94 in the disengaged position. In the releasing position, the release lever 102 permits the latch 94 to move to the engaged position.

A release spring 108 may bias the release lever 102 to the catching position. The release spring 108 may be attached to the release lever 102, e.g., to the elongated portion 104 of the release lever 102, and to the second member 38. The release spring 108 may be stiffer, i.e., may have a higher spring coefficient, than the latch spring 100.

The first member 32 includes a trip 110 positioned to push the release lever 102 to the releasing position when the second member 38 is in the retracted position, as shown in FIG. 7. The trip 110 is spaced from the release lever 102 when the second member 38 is in the extended position, as shown in FIG. 5. The trip 110 may be a protrusion from one of the outer plate 74 and the inner plate 76. For example, the trip 110 may be a protrusion from the outer plate 74, as shown in the figures.

The button 84 is movably coupled to the buckle housing 42. The button 84 is movable between an unpressed position and a pressed position. The button 84 may be moved from the unpressed position to the pressed position by the occupant pressing the button 84. The button 84 is positioned to move the latch 94 from the engaged position to the disengaged position when pressed, i.e., when moved from the unpressed position to the pressed position. For example, the button 84 may include ramps 112 positioned to progressively space the latch 94 from the second member 38 as the button 84 moves from the unpressed position to the pressed position.

When an occupant enters the passenger cabin 56 and sits in the seat 58, the spring 80 has biased the second member 38 to the extended position. The second member 38 being in the extended position elevates and makes the buckle housing 42 more accessible to the occupant. The occupant inserts the tongue 44 into the buckle-housing slot 82, moving the tongue 44 from the free position to the inserted position. The occupant continues pressing down on the tongue 44 and the buckle housing 42, moving the second member 38 from the extended position, shown in FIG. 5, to the retracted position, shown in FIG. 7. With the tongue 44 in the inserted position and the second member 38 in the retracted position, the first hole 34, the second hole 40, and the third hole 46 are aligned. As the second member 38 moves from just outside the retracted position, shown in FIG. 6, to the retracted position, shown in FIG. 7, the trip 110 moves the release lever 102 from the catching position to the releasing position. The movement of the release lever 102 to the releasing position permits the latch spring 100 to move the latch 94 from the disengaged position to the engaged position. The catching portion 98 of the latch 94 passes through the first hole 34, the second hole 40, and the third hole 46. The latch 94 holds the tongue 44 in the inserted position and the second member 38 in the retracted position.

When the occupant wishes to leave the seat 58, the occupant pushes the button 84 from the unpressed position to the pressed position. The ramps 112 move the latch 94 from the engaged position to the disengaged position. The release spring 108 moves the release lever 102 to the catching position, keeping the latch 94 in the disengaged position. The latch 94 in the disengaged position permits the tongue 44 to move to the free position as the retractor 68 retracts the webbing 52. The spring 80 moves the second member 38 from the retracted position to the extended position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
    a first member including a first hole;
    a second member including a second hole and slidably coupled to the first member between a retracted position in which the first and second holes are aligned and an extended position in which the first and second holes are spaced from each other;
    a buckle housing fixed to the second member;
    a tongue including a third hole and insertable into the buckle housing to an inserted position in which the second and third holes are aligned;
    a latch coupled to the second member and movable between an engaged position and a disengaged position;
    a latch spring biasing the latch to the engaged position; and
    a release lever movably coupled to the second member between a catching position and a releasing position;
    wherein the release lever in the catching position holds the latch in disengaged position; and
    the first member includes a trip positioned to push the release lever to the releasing position when the second member is in the retracted position.

2. The restraint system of claim 1, further comprising a spring biasing the second member to the extended position.

3. The restraint system of claim 1, wherein the latch in the engaged position extends through the first, second, and third holes when the second member is in the retracted position and the tongue is in the inserted position.

4. The restraint system of claim 1, further comprising a button movably coupled to the buckle housing and positioned to move the latch from the engaged position to the disengaged position when pressed.

5. The restraint system of claim 1, wherein the release lever in the releasing position permits the latch to move to the engaged position.

6. The restraint system of claim 1, further comprising a release spring biasing the release lever to the catching position.

7. The restraint system of claim 1, wherein the trip is spaced from the release lever when the second member is in the extended position.

8. The restraint system of claim 1, wherein the first member is elongated in a direction, and the second member is elongated in the direction.

9. The restraint system of claim 8, wherein the second member is slidable relative to the first member in the direction.

10. The restraint system of claim 8, wherein the tongue is insertable into the buckle housing in the direction.

11. The restraint system of claim 8, wherein the direction is a first direction, and the first hole, the second hole, and the third hole are aligned in a second direction transverse to the first direction when the second member is in the retracted position and the tongue is in the inserted position.

12. A restraint system comprising:
a first member including a first hole;
a second member including a second hole and slidably coupled to the first member between a retracted position in which the first and second holes are aligned and an extended position in which the first and second holes are spaced from each other;
a buckle housing fixed to the second member;
a tongue including a third hole and insertable into the buckle housing to an inserted position in which the second and third holes are aligned;
a latch movable between an engaged position and a disengaged position, wherein the latch in the engaged position extends through the first, second, and third holes when the second member is in the retracted position and the tongue is in the inserted position;
a latch spring biasing the latch to the engaged position; and
a release lever movably coupled to the second member between a catching position and a releasing position;
wherein the release lever in the catching position holds the latch in disengaged position; and
the first member includes a trip positioned to push the release lever to the releasing position when the second member is in the retracted position.

13. The restraint system of claim 12, further comprising a spring biasing the second member to the extended position.

14. The restraint system of claim 12, further comprising a button movably coupled to the buckle housing and positioned to move the latch from the engaged position to the disengaged position when pressed.

15. The restraint system of claim 12, wherein the first member is elongated in a direction, and the second member is elongated in the direction.

16. The restraint system of claim 15, wherein the second member is slidable relative to the first member in the direction.

17. The restraint system of claim 15, wherein the direction is a first direction, and the first hole, the second hole, and the third hole are aligned in a second direction transverse to the first direction when the second member is in the retracted position and the tongue is in the inserted position.

18. A restraint system comprising:
a first member including a first hole;
a second member including a second hole and slidably coupled to the first member between a retracted position in which the first and second holes are aligned and an extended position in which the first and second holes are spaced from each other;
a buckle housing fixed to the second member;
a tongue including a third hole and insertable into the buckle housing to an inserted position in which the second and third holes are aligned;
a latch coupled to the second member and movable between an engaged position and a disengaged position;
a latch spring biasing the latch to the engaged position; and
a release lever movably coupled to the second member between a catching position and a releasing position;
a release spring biasing the release lever to the catching position wherein the release lever in the catching position holds the latch in disengaged position.

* * * * *